Figure 5:
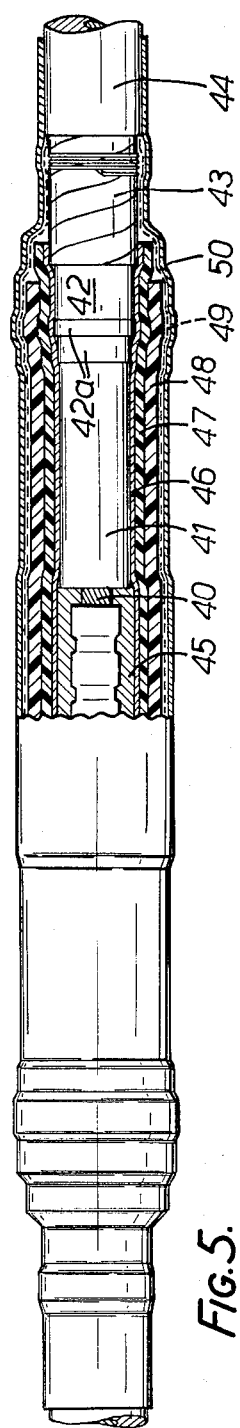

United States Patent [19]

Clabburn

[11] 4,383,131

[45] May 10, 1983

[54] SHIELDED ELECTRICAL CABLE JOINTS AND TERMINATIONS AND SLEEVE AND METHOD FOR FORMING SAME

[75] Inventor: Robin J. T. Clabburn, Menlo Park, Calif.

[73] Assignee: Raychem Limited, London, England

[21] Appl. No.: 74,336

[22] Filed: Sep. 11, 1979

[30] Foreign Application Priority Data

Sep. 14, 1978 [GB] United Kingdom ............... 36854/78
Oct. 2, 1978 [GB] United Kingdom ............... 38874/78

[51] Int. Cl.³ ................. H02G 15/068; H02G 15/188; H02G 15/04; H02G 1/14
[52] U.S. Cl. .................................... 174/73 R; 156/49; 174/88 C; 174/DIG. 8
[58] Field of Search ................... 174/19, 73 R, 73 SC, 174/DIG. 8, 88 R, 88 C; 29/869, 871; 156/49

[56] References Cited

U.S. PATENT DOCUMENTS

| | | | |
|---|---|---|---|
| 2,027,962 | 1/1936 | Currie | 264/230 |
| 2,523,313 | 9/1950 | Lee | 174/73 R X |
| 3,086,242 | 4/1963 | Cook et al. | 264/566 |
| 3,329,764 | 7/1967 | Tanges, Jr. | 174/DIG. 8 |
| 3,349,164 | 10/1967 | Wyatt | 174/73 R |
| 3,396,231 | 8/1968 | Anderson | 174/73 R |
| 3,580,986 | 5/1971 | Misare | 174/73 R |
| 3,691,291 | 9/1972 | Taj | 174/73 R |
| 3,692,922 | 9/1972 | Sugimoto et al. | 174/73 R |
| 3,717,717 | 2/1973 | Cunningham et al. | 174/DIG. 8 X |
| 3,777,048 | 12/1973 | Traut | 174/73 R |
| 3,829,600 | 8/1974 | Portinari et al. | 174/73 R |
| 3,846,578 | 11/1974 | Bahder et al. | 174/73 R |
| 3,898,369 | 8/1975 | Clabburn | 174/73 R X |
| 3,950,604 | 4/1976 | Penneck | 174/73 R X |
| 3,957,382 | 5/1976 | Greuel, Jr. et al. | 403/27 |
| 4,006,286 | 2/1977 | Larsson | 174/73 R |
| 4,035,534 | 7/1977 | Nyberg | 174/73 R X |
| 4,074,926 | 2/1978 | Broad | 174/73 R X |
| 4,164,620 | 8/1979 | Hervig | 174/73 R |
| 4,304,616 | 12/1981 | Richardson | 174/73 R X |

FOREIGN PATENT DOCUMENTS

| | | |
|---|---|---|
| 1079707 | 4/1960 | Fed. Rep. of Germany ... 174/DIG. 8 |
| 2748371 | 5/1978 | Fed. Rep. of Germany . |
| 1041503 | 9/1966 | United Kingdom . |
| 1142050 | 2/1969 | United Kingdom . |
| 1177394 | 1/1970 | United Kingdom . |
| 1240403 | 7/1971 | United Kingdom . |
| 1246829 | 9/1971 | United Kingdom . |
| 1294665 | 11/1972 | United Kingdom . |
| 1302626 | 1/1973 | United Kingdom . |
| 1303432 | 1/1973 | United Kingdom . |
| 1337951 | 11/1973 | United Kingdom . |
| 1353752 | 5/1974 | United Kingdom ......... 174/DIG. 8 |
| 1407119 | 9/1975 | United Kingdom . |
| 1411322 | 10/1975 | United Kingdom . |
| 1434719 | 5/1976 | United Kingdom . |
| 1440524 | 6/1976 | United Kingdom . |
| 1450264 | 9/1976 | United Kingdom . |
| 1470501 | 4/1977 | United Kingdom . |
| 1470502 | 4/1977 | United Kingdom . |
| 1470504 | 4/1977 | United Kingdom . |
| 1526397 | 9/1978 | United Kingdom . |
| 1551748 | 8/1979 | United Kingdom . |

OTHER PUBLICATIONS

Clabburn et al., "Heat Shrinkable Materials for 11KV Cable Systems", The Institution of Electrical Engineers, 1975.

*Primary Examiner*—Laramie E. Askin
*Attorney, Agent, or Firm*—Lyon & Lyon

[57] ABSTRACT

An enclosure for a shielded cable termination or joint comprises a protective sleeve comprising a conductive outer layer (51), an insulating inner layer (52), advantageously of substantially uniform cross-section for at least a portion of its length, and optionally a stress grading innermost layer (53). At least the insulating layer (52) and/or the stress grading layer (53) overlaps the or each cable shield, in the case of the insulating layer by an amount at least equal to the thickness of the portion of the insulating layer overlapping the cable shield end. Preferably the sleeve is installed by heat recovery.

96 Claims, 6 Drawing Figures

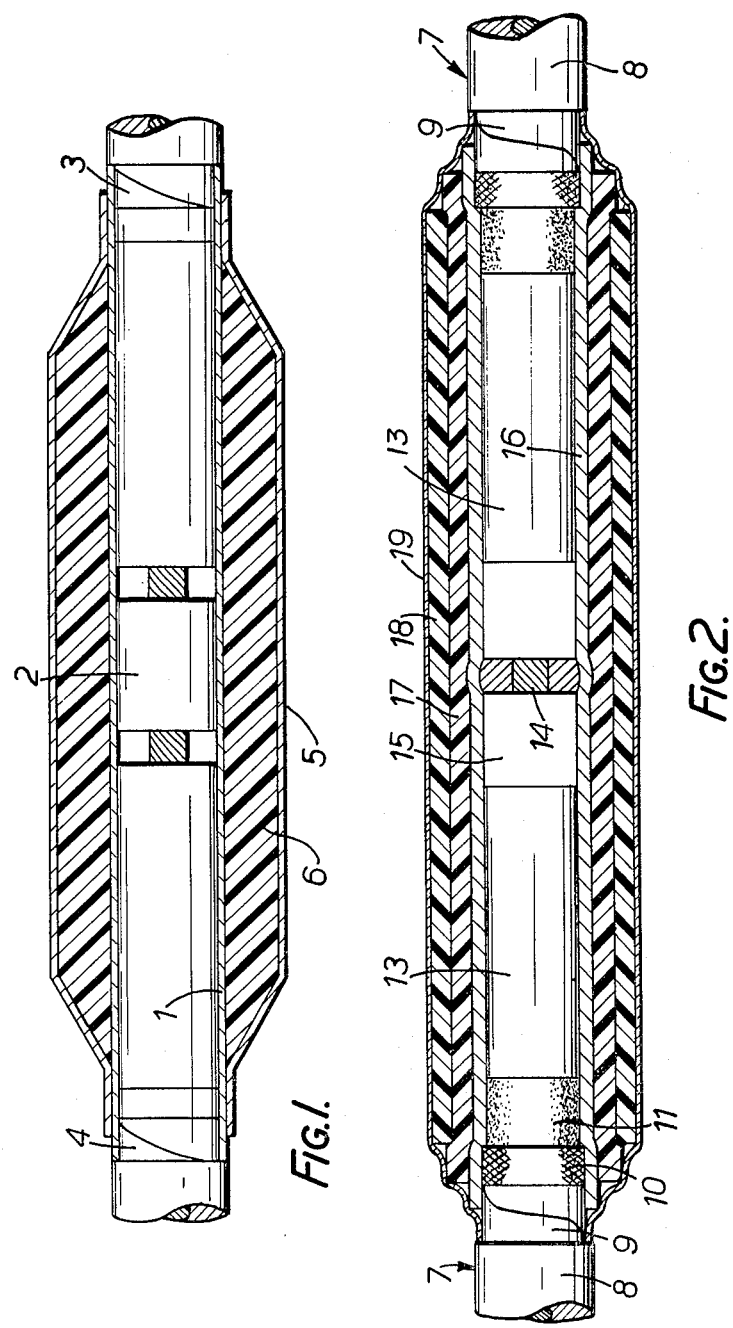

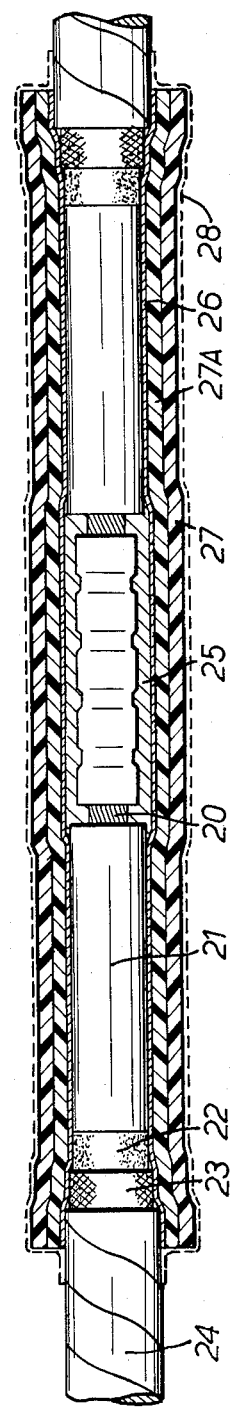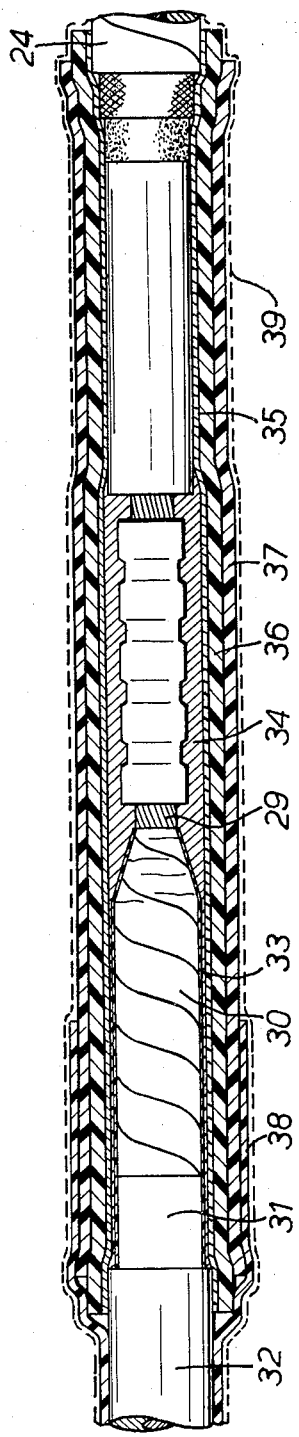

SHIELDED ELECTRICAL CABLE JOINTS AND TERMINATIONS AND SLEEVE AND METHOD FOR FORMING SAME

This invention relates to enclosures for terminations and joints for electrical cables.

When a continuously shielded high voltage cable is terminated or spliced, the shield is removed for such a distance from the termination or splice that electrical breakdown along the surface of the insulation from the exposed conductor to the shield cannot occur. The removal of the shield causes discontinuity of the electrical field so that there is severe electrical stress at the end of the shield. In order to relieve this stress and so prevent failure of the cable insulation in service, a number of methods have been proposed to provide stress control by resistive or capacitative effects, for example as described in U.S. Pat. No. 3,396,231, and British Pat. No. 1,434,719, the disclosures of which are incorporated herein by reference.

According to the present invention there is provided an enclosure for a shielded electrical cable termination or a joint between two shielded electrical cables, the or each cable comprising a conductor, a dielectric layer which surrounds the conductor and which has been cut back to expose a length of the conductor, and an electrically conductive shield which surrounds the dielectric layer and which has been cut back to expose a length of the dielectric layer, the enclosure comprising a protective sleeve comprising an insulating inner layer and a conductive outer layer electrically connected to the or each cable shield, said sleeve optionally also being provided with an innermost stress grading layer having an at least partly resistive character and extending from the exposed conductor to the or each cable shield, wherein at least the insulating layer and/or the stress grading layer if present overlaps the or each cable shield.

If the overlap is between an insulating layer only and the cable shield, the extent of the overlap is at least equal to the thickness of the portion of the insulating layer overlying the or each cable shield end and an electrical connection between the conductive outer layer and the or each cable shield is made at a point on the or each cable shield at a distance from the end of the or each cable shield at least equal to the thickness of the portion of the insulating layer overlying that cable shield end.

It will be appreciated that reference to layers overlapping does not necessarily imply that the layers are in contact.

In one aspect of the invention the enclosure comprises a protective sleeve which comprises an insulating inner layer and a conductive outer layer which is electrically connected to the or each cable shield, the sleeve having a length such that it covers the exposed insulation and overlaps the or each cable shield between the exposed conductor and the electrical connection of the conductive outer layer to the shield by an amount at least equal to the thickness of that portion of the insulating inner layer overlying the end of the shield.

Preferably the conductive outer layer is electrically connected to the or each cable shield at or beyond the end of the sleeve corresponding thereto.

The insulating inner layer is preferably formed from a material with appropriate electrical properties including discharge resistance, permittivity, and high breakdown strength and may comprise for example a polymeric matrix having dispersed therein if, necessary, a filler to give enhanced electrical properties.

Polymeric material suitable for use as the polymeric matrix may include resins comprising, for example, polyolefins and olefin copolymers such as polyethylene, polypropylene, ethylene/propylene copolymers, and polybutylenes; substituted polyolefins, particularly halogen-substituted polyolefins such as polyvinyl chloride, polyvinylidene chloride, polyvinylidene fluoride, Teflon 100 (a polytetrafluoroethylene manufactured by DuPont), Teflon FEP (a copolymer of tetrafluoroethylene and hexafluoro-propylene manufactured by DuPont) Teflon PFA (a copolymer of tetrafluoroethylene and perfluoroalkoxy moieties manufactured by DuPont), Tefzel (a terpolymer of ethylene, tetrafluoroethylene and a fluorinated monomer manufactured by DuPont), and Halar (a copolymer of ethylene and chlorotrifluroethylene manufactured by Allied Chemicals); polyesters, particularly segmented copolyester polymers such as Hytrel (segmented polyether ester copolymer derived from terephthalic acid, polytetramethylene ether glycol and 1,4-butanediol manufactured by DuPont); an polyurethanes.

Other suitable polymeric materials for use as the polymeric matrix include elastomers comprising, for example, copolymers of dienes with olefinically unsaturated monomers such as ethylene/propylene/non-conjugated diene terpolymers, styrene/butadiene polymers, butyl rubbers and copolymers of dienes with unsaturated polar monomers such as acrylonitrile, methyl methacrylate, ethyl acrylate, vinyl pyridine and methyl vinyl ketone; halogen-containing elastomers such as chloroprene polymers and copolymers, for example neoprene chlorinated polyethylene, chlorosulphonated polyethylene and Viton (a copolymer of vinylidene fluoride and hexafluoropropylene manufactured by DuPont); copolymers of olefins with olefinically unsaturated esters such as elastomeric ethylene/vinyl acetate polymers, ethylene/acrylic acid ester copolymers such as ethylene/ethyl acrylate and methacrylate copolymers and particularly ethylene/acrylic rubbers such as Vamac (a terpolymer of ethylene, methyl acrylate and a curesite monomer manufactured by DuPont); acrylic rubbers such as polyethyl acrylate, polybutyl acrylate, butyl acrylate/ethyl acrylate copolymers, and butyl acrylate/glycidyl methacrylate copolymers, silicone elastomers such as polydiorganosiloxanes, dimethylsiloxanes, methylvinylsiloxanes and methylphenylsiloxanes, fluorosilicones for example those derived from 3,3,3-trifluoropropyl siloxane and carborane siloxanes; elastomers polyurethanes; and polyethers such as epichlorohydrin rubbers.

Blends of the above-mentioned elastomers and resins may also be used. Particularly good results have been obtained using polyolefins, olefin copolymers and blends of olefin polymers.

The insulating inner layer is desirably, though not essentially, formed from a substantially track resistant, and preferably non-tracking material. By "non-tracking" there is meant a material which is resistant to the formation of dendritic, carbonaceous, electrically conducting deposits on its surface under the influence of high electrical voltages. Suitable discharge and track resistant material comprising antitracking fillers are described in British Pat. Nos. 1,041,503; 1,240,403, 1,303,432 and 1,337,951 the disclosures of which are incorporated herein by reference.

Preferably the insulating inner layer has a dielectric constant of from 2 to 6 and a volume resistivity of at least $10^{10}$, preferably at least $10^{12}$ ohm cm.

The conductive outer layer may comprise a woven or stranded metal braid but is preferably a layer of a polymeric matrix having a conductive filler dispersed therein in which case the enclosure may further comprise a woven or stranded metal braid positioned about the conductive outer layer. The polymeric matrix may comprise any of the polymeric materials listed previously, or a mixture of such materials, and the conductive filler may comprise metal particles or a conductive carbon black. Suitable carbon blacks may be chosen from among those currently commercially available, for example, types HAF, SRF, EPC, FEF and ECF. Particularly good results have been achieved using an electrically conductive polymeric composition as described in British Pat. No. 1,294,665, the disclosure of which is incorporated herein by reference. The conductive outer layer preferably comprises from 10 to 70 more particularly 10 to 20 e.g. 15 to 17, parts by weight of the conductive filler, based on the total weight of the polymeric matrix and the filler.

The conductive outer layer preferably has a resistance of less than $5 \times 10^4$ ohm cm, and most preferably less than 100 ohm cm.

The enclosures of the present invention may be formed by urging the protective sleeve into conforming engagement with the cable joint or termination to be protected. By conforming engagement is meant the property of a material to follow closely the contours of an underlying substrate. Such conforming engagement may be obtained by the use of a sleeve that comprises elastomeric or heat recoverable materials, or both. In order to eliminate the possibility of undesirable voids between the sleeve and the surface of the termination or joint, the surface thereof and/or the inner surface of the tube may be coated with an appropriate void filler such as a grease or heat activated adhesive, sealant or mastic. The enclosure may, if desired, be formed in situ by bringing successive tubular layers sequentially into conforming engagement with the cable termination or joint. Laminates of the tubular layers may also be used, and, in one preferred embodiment, the enclosure comprises a unitary tubular article having an insulating inner layer and a conductive outer layer. For the avoidance of doubt, the expression "tubular layer" in this specification does not include a structure formed in situ by helically winding a tape around a substrate.

Where the tubular article is elastomeric, it may be urged into conforming engagement with the electrical apparatus by simply pushing it onto the electrical apparatus, the elasticity of the article enabling it to conform closely to the contours thereof. In another embodiment the elastomeric tubular article may be "held-out" in a stretched state by an inner or outer hold-out member which can be removed or displaced, the elastic stresses released thereby urging the tubular article to recover into conforming engagement with the electrical apparatus. In a still further embodiment the tubular article may be bonded to the hold-out member and the bond weakened, for example by solvent or mechanical treatment, to permit recovery.

Preferably, however, the enclosure comprises a tubular article which is heat-recoverable. Usually these articles recover, on heating, towards an original shape from which they have previously been deformed, but the term "heat-recoverable" as used herein also includes an article, which on heating, adopts a new configuration, even if it has not previously been deformed. In their most common form, such articles comprise a polymeric material exhibiting the property of elastic or plastic memory as described for example, in U.S. Pat. Nos. 2,027,962, 3,086,242 and 3,957,382. In other articles, as described, for example in British Pat. Nos. 1,434,719 and 1,440,524, an elastomeric member is held in a stretched state by a second member, which upon heating, weakens and thus allows the elastomeric member to recover. The disclosures of these specifications are incorporated herein by reference. The insulating inner layer and the conductive outer layer may each be independently heat recoverable, or one or both of the layers may be elastomeric, provided that the sleeve as a whole is heat recoverable.

In contradistinction to the tubular articles which have hitherto been proposed for the protection of cable terminations and splices, the enclosure of the present invention can, if desired, be formed so as to have a substantially uniform cross-section along its entire length, at least in the stable or freely recovered state, if the enclosure is recoverable, thus enabling the enclosure to be produced by relatively inexpensive extrusion methods. This is a considerable advantage over prior art designs which frequently require sophisticated moulding operations. Although less desirable, the enclosure of the present invention could of course also be made by other methods, for example moulding or casting, as appropriate. However, the preferred method of production is by multiple extrusion of the layers, followed, if necessary, by treatment to render the extruded product recoverable. This treatment may involve, for example, cross-linking by ionising radiation or by chemical cross-linking agents, followed by expansion, for example, using differential gas pressure or a mandrel.

Earth continuity is provided across the cable termination or joint by connecting the conducting outer layer of the enclosure to the shield or shields. In order to connect the outer conducting layer to the shield or shields, the ends of the enclosure may be so shaped that the conducting outer layer is brought into direct physical and electrical contact therewith. Alternatively, indirect electrical contact may be provided by conductive members which fit on the ends of the enclosure. Such members can, for example, be metal straps, or moulded parts formed from conductive polymeric materials, which may, if desired, be heat recoverable.

Electrical contact may instead be provided by wrapping a metal braid helically around the conductive outer layer and connecting the end or ends to the sheild(s) for example by soldering The moulded parts may, for example, be annular members having grooved faces adapted to fit over the ends of the enclosure, and may advantageously be provided with an internal coating of a sealant, for example a mastic or hot melt adhesive, to give environmental protection to the ends of the enclosure. Naturally where the moulded part is employed to provide electrical contact, then any internal coating of sealant is electrically conductive.

In some circumstances, as previously mentioned, it may be found advantageous to provide the space adjacent to the exposed electrical conductor, for example the region surrounding the crimped central conductors of a cable joint, and/or the space adjacent to the end of the shield, with a void-filling material in order to minimize the possibility of breakdown due to ionization of air in any voids. Such a material may be a grease, for example a silicone grease, a mastic or a holt melt adhesive. The void filling material may have electrically insulating, conductive or semi-conductive properties although, where it has semi-conductive properties, it does not in general exhibit a significant stress grading effect since it is generally applied in localized areas. A particularly suitable void-filling material is described and claimed in German Offenlegungsschrift No. 2,748,371 the disclosure of which is incorporated herein by reference.

The invention may find application in the termination and splicing of high voltage cables operating at voltages up to 15 kV, and even higher e.g. up to 40 kV, or 72 kV in some cases. At operating voltages of up to 15 kV it is usually possible to dispense entirely with the provision of further stress control means, so that the insulating inner layer is in direct contact with the shield and/or the exposed conductor, although the invention does not exclude the possibility that further stress control means may be used. For example, at higher operating voltages e.g. up to 40 kV or up to 72 kV, it may be desirable to provide the enclosure with an inner layer of stress grading material which, when the insulating layer overlies the or each cable shield, may have electrical impedance characteristics which are resistive or capacitative, or a combination of both. Preferably, however, the stress grading layer has an at least partly resistive character and extends from the exposed conductor to the or each cable shield. Preferably the stress grading inner layer is semi-conductive and comprises a polymeric matrix having dispersed therein a conductive filler, and especially carbon black. Suitable polymeric materials and carbon blacks for use in the polymeric matrix include those listed previously. The amount of carbon black in the stress grading material will depend to some extent on the type of black used and the polymer matrix, but preferably the material comprises from 5 to 150 parts by weight of carbon black, per 100 parts by weight of resin. Alternatively, there may be used as the stress grading innermost layer a composition having non-linear electrical resistive characteristics, for example as described in British Pat. Nos. 1,470,501, 1,470,502, 1,470,503 and 1,470,504 the disclosures of which are incorporated herein by reference. In place of the polymeric materials listed previously, the stress grading innermost layer may comprise a fluid coating such as a mastic, for example as described in British Patent 1,526,397.

The stress grading innermost layer preferably has a specific impedance in the range $10^7$ to $10^{10}$ ohm cm, for example close to $10^9$ ohm cm, measured at a frequency of 50 Hz. The stress grading layer used in the closure advantageously has a D.C. resistivity in the range of $10^{10}$ to $10^{11}$ ohm cm.

Since the resistive stress grading layer, when present, extends from the exposed conductor to the or each shield when the protective sleeve is installed, it is also possible (although not essential) for the stress grading layer to extend along substantially the entire length of the sleeve. Also, it has been found that it is possible thereby to dispense with other forms of stress grading such as stress grading cones, allowing the entire sleeve to be formed by relatively inexpensive extrusion methods. Thus in a further aspect of the invention there is provided a protective sleeve for a cable termination or splice which comprises a dimensionally recoverable extruded tubular article having an innermost stress grading resistive layer, an insulating inner layer and a conductive outer layer. The relative thicknesses of the insulating inner layer and the conductive outer layer will be dictated to some extent by the required electrical properties of the enclosure, but in general the insulating layer will have a thickness of from 2 to 15 mm, preferably from 3 to 10 mm, and the conductive layer will have a thickness of from 0.5 to 5 mm, preferably from 1 to 3 mm. It has been found that for electrical cables carrying voltages such that an insulating layer thickness of up to 4 mm is no longer sufficient, additional forms of stress control are necessary. Thus for cables carrying voltages of 15 kV or greater, a stress grading innermost layer is usually required. For cables carrying voltages of 35 kV or more it may also be necessary to taper the insulating layer to a point adjacent the end of the shield as described below. Preferably, however, the insulating layer is of substantially uniform cross-section for at least the central 60%, and most preferably 75% of its length. For cables carrying voltages below 35 kV it is more preferred for the insulating layer at least in the stable or freely recovered state, to be of substantially uniform cross section along its entire length.

The invention, however, also comprehends the use of a tapered portion of the insulating layer to produce a stress cone adjacent the or each cable shield end, although such tapered portion preferably does not extend beyond the cable shield, and merely provides a "step" from a larger to a smaller cross-section portion of the insulating layer. For cables up to 15 kV, no additional stress grading layer is usually required and the insulation layer therefore overlaps the or each shield by an amount at least equal to the thickness of its substantially uniform cross-section portion. Preferably, the substantially uniform cross-section portion of the insulating layer includes that portion overlying the or each cable shield end, and therefore the insulating layer overlap is at least equal to the thickness of the insulating layer at that point. Preferably the overlap is from 2.5 to 6 times the thickness of the substantially uniform cross-section portion of the insulating layer. In the majority of cases, no significant further improvement is obtained by using an overlap in excess of 3 times the thickness of the substantially inform cross-section portion.

For cables above 15 kV, a resistive stress grading layer is preferably provided, in which case either the stress grading layer, or the insulating layer, or most preferably both, overlap the or each shield end by the required amount. For cables of 35 kV or more, at least the insulating layer and preferably both the insulating layer and the stress grading layer overlap the or each shield end by the required amount and in addition, the insulating layer preferably comprises a central portion of substantially uniform cross-section tapering at its ends towards the cable shield end as previously described. Preferably the stress grading layer extends for at least 60% of the length of the enclosure and most preferably for at least 75% of its length. In certain embodiments the stress grading layer extends for the full length of the enclosure. Desirably at least that portion of the enclosure comprising the stress grading layer should be of substantially uniform cross-section along its length in the stable or freely recovered state, that is to say, the ratio of the thicknesses of the layers is substantially constant along the length of the stress grading layer and the general configuration of the cross-section is substantially unchanged. In most cases the stress grading layer will be centrally disposed along the length of the enclosure. The thickness of the innermost stress grading layer will be dictated to some extent by the required electrical properties of the enclosure, but in general the innermost layer will have a thickness of from 0.5 to 4.0 mm.

The stress grading innermost resistive layer and the conductive outer layer are required to be in electrical contact at least after the enclosure is conformingly engaged with the electrical cable termination or joint, and this may be achieved by an appropriate configuration of the ends of the enclosure or by the provision of means for making electrical contact between the layers. Electrical contact between the stress grading innermost layer and the conductive outer layer may be direct or indirect. In its simplest form, for example, the ends of the enclosure may be profiled so that, on engagement, both the conductive outer layer and the stress grading inner layer contact the cable shield, and indirect electrical contact is thereby made through the shield. Alternatively, the ends of the enclosure may be so arranged that the insulating intermediate layer terminates just before the innermost and outer layers, thus allowing them to come into direct electrical contact. Another possibility is that indirect electrical contact may be provided by conductive members which fit on the ends of the enclosure. Such members can, for example, be metal straps, or moulded parts formed from conductive polymeric materials, which may, if desired, be heat recoverable.

The invention may be applied to the protection of terminations and joints of shield single phase and three phase electrical cables. When used with three phase cables, each conductor may be provided with an enclosure comprising a protective sleeve comprising a conductive outer layer, an inner insulating layer and optionally a stress grading innermost layer or alternatively each conductor may be provided with an inner insulating layer and optionally a stress grading innermost layer and the enclosure completed by a single conductive layer surrounding the three insulated conductors.

The invention is illustrated by the following examples. Reference is made to the accompanying drawings in which FIGS. 1 to 6 are sectional elevations of different forms of splice cover according to the invention in position on a cable.

EXAMPLE 1

A 20 kV in-line splice joint was prepared by crimping the central conductors and cutting back the screen on each side of the crimp for a distance of 6 cm. There was then positioned over the splice and shrunk into conforming engagement therewith, a piece of Raychem SCTM stress grading tubing of length 30 cm, wall thickness 0.2 cm and specific resistance (that is at D.C.) $10^{11}$ ohm cm. The recovered tubing conformed closely to the contours of the splice and was in contact with the central conductor and the shields of each side of the crimp, with a 2 cm overlap. Over the stress grading tubing there was then positioned a moulded insulating heat recoverable tube of length 30 cm, wall thickness 0.75 cm and volume resistivity $5 \times 10^{13}$ ohm cm. The ends of the tube were profiled with a taper angle of 9.2°. When the heat recoverable tubing was shrunk centrally over the splice, it was found to leave 0.5 cm of the stress grading tubing exposed at each end. Finally there was positioned over the splice a piece of conductive heat shrinkable tubing of length 35 cm, wall thickness 0.2 cm and specific resistance 1000 ohm cm and this was shrunk down so as to provide an electrical connection between the shields at each side of the splice. It was found advantageous to apply a thin layer of silicone grease between the insulating tubing and the conductive tubing. The arrangement is illustrated in FIG. 1 of the accompanying drawings which shows a side elevation of the completed enclosure in section. It can be seen that the stress grading tubing 1 extends from the crimp 2 to the shields 3 and 4. The conductive tubing 5 makes electrical connection between the shields 3 and 4 and also overlaps the stress grading tubing 1. The conductive and stress grading tubings are separated by the profiled insulating tube 6.

The splice was submitted to an average life test using an applied voltage of 20 kV AC for 1000 hrs and then increasing the voltage by 5 kV for each 500 hrs until breakdown. The results are shown in Table I.

TABLE 1

| Sample No | 20 kv | 25 kv | 30 kv | 35 kv | 40 kv | 45 kv |
|---|---|---|---|---|---|---|
| 1 | | | | | failed | |
| 2 | passed | passed | passed | passed | passed | failed |
| 3 | 1000 hours | 500 hours | 500 hours | 500 hours | 500 hours | passed |
| 4 | | | | | | 500 hours |

These results show the excellent electrical results obtained using an enclosure constructed in accordance with the invention.

EXAMPLE 2

A 24 kv in-line splice joint was simulated as shown in FIG. 2, by cutting back the jacket 8 and shield 9 of a 20 kv cross-linked polyethylene insulated cable 7 to expose the graphite impregnated cloth layer 10, graphite layer 11 and dielectric 13. A portion of the dielectric 13 was removed to expose the conductor 14, and an area 15 of the dielectric on each side of the conductor was painted with a conductive paint to form a region 10 cm in length simulating a welded joint. The length of exposed dielectric on each side of the exposed conductor between the painted areas 15 and graphite layer 11 was 12 cm.

A piece of Raychem SCTM stress grading tubing of specific resistance $10^{11}$ ohm cm was positioned over the splice and recovered to form a stress grading layer 16 that conformed to the contours of the splice and was in contact with the screen 9. A piece of Raychem BBIT insulation tubing 17 of recovered wall thickness 4 mm (that is, of wall thickness 4 mm if allowed to recover completely) was then recovered over the stress grading layer 16 and a second piece of BBIT tubing 18 of the same wall thickness was recovered over the first tubing after a thin film of silicone grease had been applied to the surface of first, recovered insulation layer 17. The lengths of the two pieces of BBIT tubing 17, 18 were such that, after recovery, about 1 cm of the first insulation layer and about 1 cm of the stress grading layer were exposed at each end of the splice. Finally a layer of graphite was sprayed onto the outer surface of the second insulation layer and a piece of Raychem CNTM conductive tubing 19 was recovered over the splice. The length and recovered diameter of the conductive tubing were chosen so that, on recovery, the conductive tubing would form an electrical connection with the exposed portions of the stress grading layer 16 and the cable shield 9 at each end of the splice.

Five such joints were submitted to the test sequence shown in table II.

TABLE II

| Test | 1 | 2 | 3 | 4 | 5 |
|---|---|---|---|---|---|
| Discharge extinction voltage (DEV) (1) | 35 kv | 32 kv | 17 kv | 29 kv | 26 kv |
| Discharge at 50 kv | 10 pC | 50 pC | 5 pC | 50 pC | 60 pC |
| 55 kv AC for 1 min. | passed | passed | passed | passed | passed |
| Bending-sample cold (2) | " | " | " | " | " |
| DEV (1) | 34 kv | 32 kv | 17 kv | 29 kv | 26 kv |
| Bending-sample semi-warm (2) | passed | passed | passed | passed | passed |
| DEV (1) | 35 kv | 30 kv | 17 kv | 28 kv | 26 kv |
| AC to breakdown | 110 kv$^a$ | 105 kv$^a$ | 115 kv$^a$ | 80 kv$^b$ | 110 kv$^a$ |
| Positive impulse to breakdown in steps of 10 kv | 210 kv$^a$ | 220 kv$^a$ | 200 kv$^a$ | — | 210 kv$^a$ |
| Positive DC to breakdown in steps of 10 kv | 260 kv$^a$ | 150 kv$^a$ | 160 kv$^a$ | — | 150 kv$^a$ |
| Load cycling at 95° C. 50 kv applied 63 cycles (3) | passed | passed | passed | — | passed |
| 55 kv AC, 1 min | passed | passed | passed | — | passed |
| DEV (1) | 15 kv | 13 kv | 17 kv | — | 15 kv |
| Load cycling at 95° C. 30 kv applied, 169 cycles (3) | passed | passed | passed | — | passed |
| DEV (1) | 16 kv | 15 kv | 14 kv | — | 13.5 kv |
| Discharge at: | | | | | |
| 15 kv | <0.5 pl | <0.5 pl | 3 pl | — | 13.5 pl |
| 24 kv | 18 pC | 15 pC | 10 pC | — | 20 pC |
| 85 kv AC 1 min | passed | passed | passed | — | passed |
| 55 kv AC 4 hours | " | " | " | — | " |
| 128 kv DC, 30 mins | " | " | " | — | " |
| Impulse + 185 kv 10 shots | " | " | " | — | " |
| 58 kv AC, 800 hours | " | " | " | — | (c) |
| 40 kv AC 4300 hours | " | " | " | — | (c) |
| 30 kv AC 2350 hours | " | " | " | — | (c) |

Notes:
(1) The discharge extinction voltage is measured using an ERA discharge detector. A 50 Hertz AC potential is applied to the conductor and the potential is raised until activity is observed. The potential is then reduced until the response of the discharge magnitude is 0.5 pC and recorded as the discharge extinction voltage.
(2) The cable and splice is bent round a test cylinder of diameter 20 (D + d) where D is external diameter of the cable and d is the diameter of the conductor. The cable is then rotated round its axis by 180° and again bent round the cylinder. After the operations have been repeated, a 55 kv potential is applied for one minute and, if no breakdown occurs, the sample has passed.
(3) The cable is heated to the specified temperature by a 30 kv heating current for five hours and is then allowed to cool for three hours during each cycle while maintaining the conductor at a potential of 30 kv
$^a$flashover at termination
$^b$breakdown in joint

EXAMPLE 3

A 15 kv splice as shown in FIG. 3 was formed between two 15 kv polyethylene cables comprising a 50 mm$^2$ copper conductor 20, polyethylene dielectric 21, graphite layer 22, graphite impregnated cloth layer 23, metal screen 24 and outer jacket (not shown). The central copper conductors 20 were crimped and the screen 24 was cut back from the end of the dielectric for a distance ranging from 9 to 15 cm to expose the graphite impregnated cloth layer 23. The cloth layer was cut back to 2 cm from the screen and the graphite layer extending beyond 1 cm from the cloth layer was removed. A quantity of epihalohydrin stress-grading material 25 as described in German OLS 2748371 was applied over the crimp and exposed conductors, and a piece of Raychem stress-grading tubing 26 was recovered over the splice so that it conformed to the contours of the splice and overlapped the cable screen 24 at each end. A piece of Raychem BBIT insulation tubing 27A of recovered wall thickness 4 mm having a volume resistivity of at least 10$^{13}$ ohm cm and a length equal to that of the stress grading tubing was then recovered over the stress grading layer 26, followed by a piece of Raychem CES dual extrusion tubing 27. The dual extrusion tubing comprised an inner insulating layer of wall thickness about 3 mm and an outer conductive polymer layer of wall thickness about 0.7 mm. The length of the dual extrusion tubing was substantially the same as that of the insulating layer 27A although it is possible for the length of the outer insulating layer and/or conducting layer to be longer or shorter than the inner insulating layer. Finally a copper braid 28 was positioned over the splice so that it was in conforming engagement with the outer conductive layer of the dual extrusion tubing and was also in contact with the cable screen 24 at each end of the splice.

Four splices were prepared in which the distance "A" between the centre of the splice and the screen 24 was varied between 12 and 18 cm, and were subjected to the test sequence shown in Table III.

TABLE III

| Test | Joint 1<br>A = 18 cm | Joint 2<br>A = 14 cm | Joint 3<br>A = 13 cm | Joint 4<br>A = 12 cm |
|---|---|---|---|---|
| AC-step test to breakdown steps of 5 kv each min. termination flashover occurred at: | 110 kv | 105 kv | 115 kv | 110 kv |
| Impulse step test to breakdown steps of 10 kv + wave termination flashover occured at: | 200 kv | 220 kv | 210 kv | 210 kv |
| DEV (1) | 45 kv | 36 kv | 35 kv | 37 kv |
| Discharge at | | | | |
| 25 kv | <0.5 pC | <0.5 pC | <0.5 pC | <0.5 pC |
| 30 kv | <0.5 pC | <0.5 pC | <0.5 pC | <0.5 pC |
| Load cycling 75° C. 30 kv applied, 126 cycles | passed | passed | passed | passed |
| DEV (1) | 42 kv | 20 kv | 40 kv | 19 kv |
| Discharge at | | | | |
| 25 kv | <0.5 pC | 3 pC | <0.5 pC | 20 pC |
| 30 kv | <0.5 pC | 15 pC | <0.5 pC | 100 pC |
| AC-step test to breakdown steps of 5 kv each min. Termination flashover occurred at: | 100 kv | 110 kv | 105 kv | 110 kv |
| Impulse step test to breakdown steps of 10 kv + wave termination flashover occurred at: | 190 kv | 210 kv | 200 kv | 190 kv |
| Loadcycling 5/3 hrs 75° C., 30 kv under 20 cm water 305 cycles | passed | passed | failed after 259 cycles | passed |

EXAMPLE 4

An 11 kv in-line splice joint was formed by crimping together the conductors of a 10 kv cross-linked polyethylene insulated cable and an 11 kv paper insulated cable as shown in FIG. 4. The paper insulated cable comprised a copper conductor 29, paper insulation layer 30, aluminium foil 31, lead sheath 32 and a cloth tape (not shown) between the aluminium foil and the lead sheath. The lead sheath 32, cloth tape and aluminium foil 31 were cut back to expose about 6 cm of the paper insulation 30, and a varnished nylon tape 33 was wrapped around the aluminium foil and paper insulation, to prevent the end of the paper insulation from becoming unwrapped. The 10 kv polyethylene cable was prepared as described in Example 3, so that 6 cm of the dielectric was exposed. An epihalohydrin stress-grading void filling material 34 was applied around the crimp and pieces of SCTM stress-grading tubing 35, BBIT insulation tubing 36 and CES dual extrusion tubing 37 manufactured by Raychem were recovered over the cable as described in Example 3. A polyethylene sealing sleeve 38 was recovered over the paper insulated cable end of the dual extrusion tubing 37 in order to prevent any leakage of oil from the cable, and finally, a tin-plated copper braid 39 was applied over the splice so that it was in electrical contact with the lead sheath 32 of the paper insulated cable and the metal screen 24 of the polyethylene insulated cable. Five such joints were subjected to the test sequence in Table IV.

TABLE IV

| Test | Joint 1 | 2 | 3 | 4 | 5 |
|---|---|---|---|---|---|
| 45 kv AC, 1 min. | passed | passed | passed | passed | passed |
| +/− 140 kv impulse 10 shots | " | " | " | " | " |
| Load cycling, 70° C. 20 kv 125 cycles (3) | " | " | " | " | " |
| 20 kv AC under 25 cm of water | No breakdown after 2005 hours | | | | |

EXAMPLE 5

A 10 kv splice joint as shown in FIG. 5 was formed between two 10 kv cables comprising an aluminium conductor 40, cross-linked polyethylene dielectric 41, semi-conducting layer 42, metal screen 43 and jacket 44. The joint was formed by crimping the conductors 40 together and cutting back the semi-conducting layer 42, screen 43 and jacket 44 as shown in the drawing to leave about 6 cm of exposed dielectric 41. A band of conductive paint 42a was applied over the end of the semi-conducting layer 42 and the adjacent part of the dielectric 41 and, after a quantity of epihalohydrin stress grading void filling material 45 had been applied around the crimp, a piece of Raychem SCTM stress grading tubing 46 was recovered over joint so that the ends of the tubing overlapped the metal screen 43 of each cable. A piece of Raychem BBIT insulating tubing 47 of the same length as the stress grading tubing 46 was recovered over the stress grading tubing followed by a slightly shorter piece of Raychem dual extrusion tubing 48 comprising an insulating inner layer and a conductive outer layer so that the combined wall thickness of the recovered BBIT tubing and the insulating layer of the dual extrusion tubing was at least 1.2 times the thickness of the dielectric 41. A tin-plated copper braid screen 49 was then positioned over the dual extrusion tubing 48 so that it was in electrical contact with the cable screen 43 at each end of the splice and finally a jacket 50 was recovered over the splice so that it overlapped the cable jacket 44 at each end of the splice.

Four identical splice joints were subjected to the tests shown in Table V.

TABLE V

| Test | Joint | | | |
|---|---|---|---|---|
| | 1 | 2 | 3 | 4 |
| DEV (1) | 20 kv | 18 kv | 23 kv | 20 kv |
| Load cycling 95° C. 30 kv but under 25 cm water (3) | No breakdown after 336 cycles | | | |

EXAMPLE 6

Figure 6:
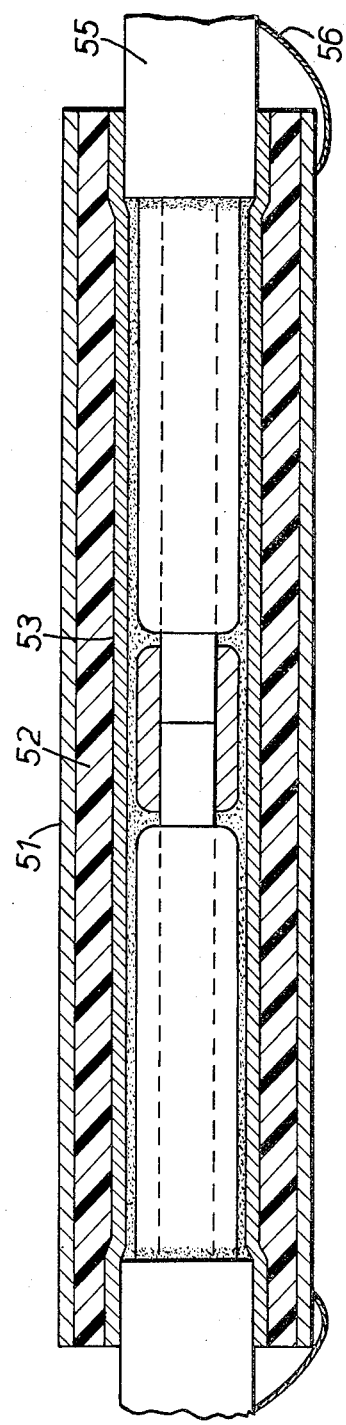

A heat-recoverable coextruded tubular 5–8 kv joint enclosure as shown in FIG. 6 comprised a radially outermost layer 51 comprising conductive high carbon loaded polyethylene, a radially intermediate layer 52 comprising insulated modified polyethylene and a radially innermost layer 53 comprising a stress-grading layer. The tube was rendered heat shrinkable by electron beam radiation cross-linking and expansion under heat to an expansion ratio of 3.5:1. In the fully recovered condition, the wall thicknesses for the various layers were 1 mm for the conductive outer layer, 5 mm for the insulating intermediate layer and 1 mm for the inner stress-grading layer. The conductive layer had a specific resistance of 1000 ohm cm, the insulating layer had a volume resistivity of $5 \times 10^{13}$ ohm cm and the stress-grading layer a specific resistance of $10^{11}$ ohm cm. A 5–8 kv in-line cable joint was prepared by crimping the central conductors of a cable and cutting back the cable screen 55 on each side of the crimp for a distance of 6 cm. The expanded jointing enclosure was positioned over the joint and shrunk down by heating such that the recovered tubing conformed closely to the contours of the joint and was in contact with the central conductors and the shields on either side of the crimp with a 2½ cm overlap onto each shield. The outer layer 51 of the enclosure was then electrically connected to the cable screen 55 at each end of the enclosure by means of wires 56 in order to provide earth continuity across the joint.

EXAMPLE 7

The procedure of Example 6 was repeated employing a coextruded tube having an inner insulating layer and an outer conducting layer. After the tube was expanded, a layer of hot melt adhesive was applied onto the innermost surface of the tube. Tubes of different dimensions were produced in this fashion, the details being as follows:

| | EXTRUDED DIAMETER | EXPANDED DIAMETER | LENGTH |
|---|---|---|---|
| I. | 0.24 | 0.8 | 14 |
| II. | 0.30 | 1.0 | 16 |
| III. | 0.40 | 1.25 | 16 |
| IV. | 0.675 | 2.225 | 18 |
| V. | 0.85 | 2.8 | |

(All dimensions shown being in inches).

Before installation the cable shields were cut back such that the distance from shield to crimp was at least 3 inches and from shield to shield at most 9 inches for tubes I and II, at most 11 inches for tubes III and IV and at most 10 inches for tube V. On recovery of the tubes onto the joints a minimum overlap of the tubes onto each shield was provided as follows:

1.8 inches for tube I, 2.7 inches for tube II, 1.7 inches for tube III, 2.6 inches for tube IV and 1.6 inches for tube V.

EXAMPLE 8

An 8.7 kV in-line splice joint was prepared by crimping the central conductors of two 2 AWG shielded cables having an ethylene propylene insulation, a copper tape metallic shield and a PVC jacket. Each cable jacket was cut back from 23 cm and the shield for 14 cm from the centre of the crimp and a small quantity of Raychem stress relief compound was applied to the crimp and at the edge of each cable shield. A piece of Raychem heat-recoverable dual extrusion tubing having a conductive outer layer, an insulating inner layer and a quantity of hot-melt adhesive on the inner layer was positioned over the joint and recovered onto it. The dual extrusion tubing had a length of 42 cm, an internal diameter of 3.6 cm and a ratio of expanded to recovered diameter of about 3:1. The expanded wall thickness of the insulating layer was 0.46 cm and that of the conductive layer was about 0.1 cm. The outer conductive layer was connected to the cable shields by wrapping a length of tinned copper braid helically around the recovered tubing and soldering or clamping the ends of the braid to the exposed part of the shield at each end of the tubing. A quantity of sealant was then applied to the end of each cable jacket and an outer heat recoverable protective sleeve was recovered over the splice.

Three of the above splice joints together with three each of the three modifications described below were subjected to the tests shown in Table VI.

| Modification 1 | The cable was replaced by a 410 AWG cable of the same construction. |
|---|---|
| Modification 2 | The dual extrusion tubing had a length of 47 cm, and an expanded internal diameter of 5.1 cm. Each cable jacket was cut back for 25.5 cm and the shield for 16.5 cm from the centre of the crimp. |
| Modification 3 | The cable was replaced by a 500 MCM copper conductor cable with extruded strand screen, crosslinked polyethylene insulation, extruded insulation screen, wire shield and PVC jacket. |

TABLE VI

| Test | |
|---|---|
| DEV[1] | 7.5 kV (for <.3 pC discharge) |
| 35 kV AC at 60 H₃ for 1 minute | No breakdown or flashover |
| 25 kV AC at 60 H₃ for 6 hours | No breakdown or flashover |
| Impulse voltage test[4] | 95 kV |
| 65 kV DC negative polarity for 15 mins. | No breakdown or flashover |
| Loadcycling 12.6 kV 21 cycles[5] | No breakdown or flashover |

NOTES:
[4] The test voltage applied was a 1.2 × 50 microsecond wave having a crest value of 95 kV. Samples were subjected to 3 impulses of both positive and negative polarity.
[5] The joints were subjected to 21 cycles each. Each cycle lasted for 24 hours. During the first 8 hours, sufficient current was induced to raise the conductor temperature to 90° C. ± 5° C., and during the second 16 hours the conductor temperature returned to ambient. An AC potential of 12.6 kV (2.5 times phase-to-ground) was applied continuously during the entire 21 cycles. At the end of 21 cycles all joints were subjected to another DC negative potential of 42 kV (65% of original test level) for 15 minutes.

Five further samples according to modification 1 were subjected to short circuit tests in which an asymmetric 5 kV alternating current at 4 kV was applied for 16 cycles and the shield was examined. After this a further asymmetric 30 kV alternating current at 4 kV was applied for 16 cycles and the conductor was examined. All samples passed with minimum visual damage.

Four of the above unmodified splice joints were installed on cables having an outer diameter of from 1.65 to 2.4 cm (that is, below the cable diameter for which they are designed). The joints were heated in air for one hour using sufficient current to raise the conductor temperature to 90±5° C. and then, within three minutes from stopping the current, were submerged under 1 ft. of water. This sequence was repeated 49 times and the joints were then subjected to 35 kV AC for 1 minute and 65 kV AC for 15 minutes. All the joints passed with no breakdown or flashover, indicating the cyclic loading of the joints with high current does not cause moisture ingress into the joint.

This test was repeated on the same joints after a one square inch hole has been cut into the cable jacket at each end of the joint. All the joints passed with no breakdown or flashover, indicating that the internal sealing of the joint will prevent moisture that has entered through a damaged cable jacket from entering the area of the connection.

I claim:

1. A shielded electrical cable termination comprising:
   (a) a shielded electrical cable comprising a conductor, a dielectric layer which surrounds the conductor and which has been cut back to expose a length of the conductor, and an electrically conductive shield which surrounds the dielectric layer and which has been cut back to expose a length of the dielectric layer; and
   (b) a tubular enclosure comprising a tubular protective sleeve comprising an insulating inner layer and a conductive outer layer electrically connected to and overlapping the cable shield, the conductive outer layer being spaced from the cable shield by the insulating layer, wherein the insulating layer has a substantially uniform wall thickness along its entire length and overlaps the cable shield by an amount at least equal to the thickness of the portion of the insulating layer overlying the cable shield end, and
   wherein electrical connection between the conductive outer layer and the cable shield is made at a point on the cable shield at a distance from the end of the cable shield at least equal to the thickness of the portion of the insulating layer overlying the cable shield end.

2. A termination as claimed in claim 1 which includes a stress grading layer located between the cable and the insulating layer at least in the region of the exposed conductor.

3. A termination as claimed in claims 1 or 2, which includes a stress grading layer located between the cable and the insulating layer at least in the region of the end of the cable shield.

4. A termination as claimed in claim 1 including a stress grading layer between the cable and the insulating layer, the stress grading layer being electrically connected to the cable shield.

5. A termination as claimed in claim 1, wherein the sleeve is provided with an innermost stress grading layer having an at least partly resistive character and extending from the exposed conductor to the cable shield.

6. A termination as claimed in claim 5, wherein the stress grading layer overlaps the cable shield.

7. A termination as claimed in claim 6 in which the insulating layer and the stress grading layer each overlap the cable shield by an amount equal to 2.5 times the thickness of the portion of the insulating inner layer overlying the shield end.

8. A termination as claimed in claims 1, 4, 5, or 6, wherein the tubular sleeve overlaps the cable shield by not more than 6 times the thickness of the portion of the insulating inner layer overlying the shield end.

9. A termination as claimed in claims 1, 4, 5, or 6 wherein the insulating layer overlaps the cable shield by an amount at least equal to 2.5 times the thickness of the portion of the insulating inner layer overlying the shield end.

10. A termination as claimed in claim 9 wherein the tubular sleeve overlaps the cable shield by not more than six times the thickness of the portion of the insulating inner layer overlying the shield end.

11. A shielded electrical cable termination comprising:
    (a) a shielded electrical cable comprising a conductor, a dielectric layer which surrounds the conductor and which has been cut back to expose a length of the conductor, and an electrically conductive shield which surrounds the dielectric layer and which has been cut back to expose a length of the dielectric layer; and
    (b) a tubular enclosure comprising a tubular protective sleeve comprising an insulating inner layer and a conductive outer layer electrically connected to the cable shield, the sleeve also being provided with an innermost stress grading layer having at least partly resistive character and extending from the exposed conductor to the cable shield, wherein the insulating layer has a substantially uniform wall thickness along its entire length and overlies the cable shield, and wherein the stress grading layer overlaps the cable shield, and
    wherein electrical connection between the conductive outer layer and the cable shield is made at a point on the cable shield at a distance from the end of the cable shield at least equal to the thickness of the portion of the insulating layer overlying the cable shield end.

12. A termination as claimed in claim 1, 5, 6, or 11 wherein the insulating inner layer has been formed, together with the conductive outer layer, by coextrusion.

13. A termination as claimed in claims 1, 5, 6, or 11 which includes a quantity of void filling material located between the cable and the sleeve in the region of the exposed conductor.

14. A termination as claimed in claim 13 wherein the quantity of void filling material is also located between the cable and the sleeve in the region at the end of the cable shield.

15. A termination as claimed in claims 1, 5, 6, or 11 wherein the outer conductive layer is electrically connected to the cable shield by a separate connection member.

16. A termination as claimed in claims 5, 6, or 11 wherein the stress grading layer overlaps the cable shield by an amount at least equal to 2.5 times the thickness of the portion of the insulating inner layer overlying the shield end.

17. A termination claimed in claims 1, 5, 6, or 11 wherein the conductive outer layer has been formed by extrusion.

18. A termination as claimed in claim 17, wherein the insulating layer is formed by extrusion.

19. A termination as claimed in claims 5, 6, or 11 wherein the stress grading layer has been formed by extrusion.

20. A termination as claimed in claims 5, 6, or 11 wherein the insulating layer and the stress grading layer have been formed by extrusion.

21. A termination as claimed in claims 5, 6, or 11 wherein the insulating inner layer, the conductive outer layer, and the stress grading layer are all formed by co-extrusion.

22. A termination as claimed in claims 1, 5, 6, or 11 which includes a quantity of void filling material located between the cable and the sleeve in the region at the end of the cable shield.

23. A termination as claimed in claims 1, 5, 6, or 11 wherein the insulating inner layer has been formed by extrusion.

24. A shielded electrical cable termination comprising:
  (a) a shielded electrical cable comprising a conductor, a dielectric layer which surrounds the conductor and which has been cut back to expose a length of the conductor, and an electrically conductive shield which surrounds the dielectric layer and which has been cut back to expose a length of the dielectric layer; and
  (b) an enclosure comprising a protective sleeve comprising an insulating inner layer and a conductive outer layer electrically connected to and overlapping the cable shield, the conductive outer layer being radially spaced from the cable shield by the insulating layer, wherein the insulating layer overlaps the cable shield by an amount at least equal to the thickness of the portion of the insulating layer overlying the cable shield end, and
  wherein electrical connection between the conductive outer layer and the cable shield is made at a point on the cable shield at a distance from the end of the cable shield at least equal to the thickness of the portion of the insulating layer overlying the cable shield end.

25. A termination as claimed in claim 24 including a stress grading layer between the cable and the insulating layer, the stress grading layer being electrically connected to the cable shield.

26. A shielded electrical cable termination comprising:
  (a) a cable comprising a conductor, a dielectric layer which surrounds the conductor and which has been cut back to expose a length of the conductor, and an electrically conductive shield which surrounds the dielectric layer and which has been cut back to expose a length of the dielectric layer, and
  (b) an enclosure comprising a tubular protective sleeve comprising an innermost stress grading layer having an at least partly resistive character and extending from the exposed conductor to overlap the cable shield, a conductive outer layer electrically contacting the stress grading layer at said overlap with the cable shield, and an insulating layer that separates the stress grading layer and the conductive layer in the region between said overlap and the exposed conductor.

27. A shielded electrical cable termination comprising:
  (a) a cable comprising a conductor, a dielectric layer which surrounds the conductor and which has been cut back to expose a length of the conductor, and an electrically conductive shield which surrounds the dielectric layer and which has been cut back to expose a length of the dielectric layer, and
  (b) an enclosure comprising a tubular protective sleeve comprising an inner insulating layer having a first portion of substantially uniform minimum thickness overlapping the cable shield by an amount at least equal to said minimum thickness, a contiguous second portion of gradually increasing thickness to provide stress control, and a contiguous third portion of substantially uniform maximum thickness extending to the region of the exposed conductor, and an outer conductive layer overlapping the cable shield, radially spaced apart from the cable shield, and electrically connected to the cable shield at a distance from the end of the cable shield at least equal to said minimum thickness.

28. The termination as claimed in claim 27 which includes a stress grading layer located between the cable and the insulating layer at least in the region of the exposed conductor.

29. The termination as claimed in claim 27 which includes a stress grading layer located between the cable and the insulating layer at least in the region of the end of the cable shield.

30. The termination as claimed in claim 27 including a stress grading layer between the cable and the insulating layer, the stress grading layer being electrically connected to the cable shield.

31. A shielded electrical cable termination comprising:
  (a) a shielded electrical cable comprising a conductor, a dielectric layer which surrounds the conductor and which has been cut back to expose a length of the conductor, and an electrically conductive shield which surrounds the dielectric layer and which has been cut back to expose a length of the dielectric layer; and
  (b) an enclosure comprising a protective sleeve comprising (i) an insulating inner layer overlying the cable shield and (ii) a conductive outer layer electrically connected to the cable shield, said sleeve also being provided with (iii) an innermost stress grading layer having at least partly resistive character and electrically connected to the cable shield, and
  wherein electrical connection between the conductive outer layer and the cable shield is made at a point on the cable shield at a distance from the end of the cable shield at least equal to the thickness of the portion of the insulating layer overlying the cable shield end and beyond the end of the insulating layer overlying the cable shield end.

32. The termination of claim 31 wherein the insulating layer has a substantially uniform wall thickness along its entire length.

33. A shielded electrical cable termination comprising:
  (a) a shielded electrical cable comprising a conductor, a dielectric layer which surrounds the conductor and which has been cut back to expose a length of the conductor, and an electrically conductive shield which surrounds the dielectric layer and which has been cut back to expose a length of the dielectric layer; and (b) an enclosure comprising a tubular protective sleeve comprising (i) an insulating inner layer overlying the cable shield and (ii) a conductive outer layer electrically connected to the cable shield, said sleeve also being provided with (iii) an innermost stress grading layer having at least partly resistive character and electrically connected to the cable shield, wherein the insulating layer has a substantially uniform wall thickness along its entire length, and wherein electrical connection between the conductive outer layer and the cable shield is made at a point on the cable shield at a distance from the end of the cable shield at least equal to the thickness of the portion of the insulating layer overlying the cable shield end.

34. The termination of claims 32 or 33 wherein the stress grading layer overlaps the cable shield.

35. A shielded electrical cable termination comprising:

(a) a shielded electrical cable comprising a conductor, a dielectric layer which surrounds the conductor and which has been cut back to expose a length of the conductor, and an electrically conductive shield which surrounds the dielectric layer and which has been cut back to expose a length of the dielectric layer; and (b) an enclosure comprising a protective sleeve comprising an insulating inner layer and a conductive outer layer electrically connected to the cable shield, said sleeve also being provided with an innermost stress grading layer having at least partly resistive character and electrically connected to the cable shield, and wherein both the conductive outer layer and the stress grading layer overlie the cable shield end.

36. The termination of claim 35 wherein the insulating layer has a substantially uniform wall thickness along its entire length.

37. The termination of claim 36 wherein the insulating layer is formed by extrusion.

38. The termination of claim 35 wherein the conductive outer layer is in contact with the stress grading layer where the stress grading layer overlies the cable shield.

39. A shielded electrical cable termination comprising:

(a) a cable comprising a conductor, a dielectric layer which surrounds the conductor and which has been cut back to expose a length of the conductor, and an electrically conductive shield which surrounds the dielectric layer and which has been cut back to expose a length of the dielectric layer, and (b) an enclosure comprising a tubular protective sleeve comprising an insulating inner layer, a conductive outer layer electrically connected to the cable shield and an innermost stress grading layer having at least partly resistive character and extending from the exposed conductor to the cable shield; said insulating layer having a first portion of substantially uniform minimum thickness overlapping the cable shield by an amount at least equal to said minimum thickness, a contiguous second portion of gradually increasing thickness to provide stress control, and a contiguous third portion of substantially uniform maximum thickness extending to the region of the exposed conductor, and the outer conductive layer overlapping the cable shield, radially spaced apart from the cable shield, and electrically connected to the cable shield at a distance from the end of the cable shield at least equal to said minimum thickness.

40. A shielded joint between two shielded electric cables comprising:

(a) two shielded electrical cables, each cable comprising a conductor, a dielectric layer which surrounds the conductor and which has been cut back to expose a length of the conductor, and an electrically conductive shield which surrounds the dielectric layer and which has been cut back to expose a length of the dielectric layer; and (b) a tubular enclosure comprising a tubular protective sleeve comprising an insulating inner layer and a conductive outer layer electrically connected to and overlapping each cable shield, the conductive outer layer being spaced from each cable shield by the insulating layer, wherein the insulating layer has a substantially uniform wall thickness along its entire length and overlaps each cable shield by an amount at least equal to the thickness of the portion of the insulating layer overlying that cable shield end, and wherein electrical connection between the conductive outer layer and each cable shield is made at a point on that cable shield at a distance from the end of that cable shield at least equal to the thickness of the portion of the insulating layer overlying that cable shield end.

41. A joint as claimed in claim 40 which includes a stress grading layer located between each cable and the insulating layer at least in the region of the exposed conductor.

42. A joint as claimed in claim 40 or 41 which includes a stress grading layer located between each cable and the insulating layer at least in the region of the end of each cable shield.

43. A joint as claimed in claim 40 including a stress grading layer between each cable and the insulating layer, the stress grading layer being electrically connected to each cable shield.

44. A joint as claimed in claim 40 wherein the sleeve is provided with an innermost stress grading layer having an at least partly resistive character and extending from the exposed conductor to each cable shield.

45. A joint as claimed in claim 44 wherein the stress grading layer overlaps each cable shield.

46. A joint as claimed in claim 45 in which the insulating layer and the stress grading layer each overlap each cable shield by an amount equal to 2.5 times the thickness of the portion of the insulating inner layer overlying the shield end.

47. A joint as claimed in claims 40, 44, or 45 wherein the tubular sleeve overlaps each cable shield by not more than 6 times the thickness of the portion of the insulating inner layer overlying that shield end.

48. A joint as claimed in claims 40, 44, or 45 wherein the insulating layer overlaps each cable shield by an amount at least equal to 2.5 times the thickness of the portion of the insulating inner layer overlying that shield end.

49. A joint as claimed in claim 48 wherein the tubular sleeve overlaps each cable shield by not more than six times the thickness of the portion of the insulating inner layer overlying that shield end.

50. A shielded joint between two shielded electrical cables comprising:
  (a) two shielded electrical cables, each comprising a conductor, a dielectric layer which surrounds the conductor and which has been cut back to expose a length of the conductor, and an electrically conductive shield which surrounds the dielectric layer and which has been cut back to expose a length of the dielectric layer; and
  (b) a tubular enclosure comprising a tubular protective sleeve comprising an insulating inner layer and a conductive outer layer electrically connected to each cable shield, the sleeve also being provided with an innermost stress grading layer having at least partly resistive character and extending from the exposed conductor to each cable shield, wherein the insulating layer has a substantially uniform wall thickness along its entire length and overlaps each cable shield, and wherein the stress grading layer overlaps each cable shield, and
  wherein electrical connection between the conductive outer layer and each cable shield is made at a point on that cable shield at a distance from the end of that cable shield at least equal to the thickness of the portion of the insulating layer overlying that cable shield end.

51. A joint as claimed in claims 40, 44, 45, or 50 wherein the insulating inner layer has been formed, together with the conductive outer layer by co-extrusion.

52. A joint as claimed in claims 40, 44, 45, or 50 which includes a quantity of void filling material located between each cable and the sleeve in the region of the exposed conductor.

53. A joint as claimed in claim 52 wherein the quantity of void filling material is also located between each cable and the sleeve in the region at the end of each cable shield.

54. A joint as claimed in claims 40, 44, 45, or 50 wherein the outer conductive layer is electrically connected to each cable shield by a separate connection member.

55. A joint as claimed in claims 44, 45, or 50 wherein the stress grading layer overlaps each cable shield by an amount at least equal to 2.5 times the thickness of the portion of the insulating inner layer overlying the shield end.

56. A joint as claimed in claims 40, 44, 45, or 50 wherein the conductive outer layer has been formed by extrusion.

57. A joint as claimed in claim 56 wherein the insulating layer is formed by extrusion.

58. A joint as claimed in claims 44, 45, or 50 wherein the stress grading layer has been formed by extrusion.

59. A joint as claimed in claims 44, 45, or 50 wherein the insulating layer and the stress grading layer have been formed by extrusion.

60. A joint as claimed in claims 44, 45, or 50 wherein the insulating inner layer, the conductive outer layer, and the stress grading layer are all formed by co-extrusion.

61. A joint as claimed in claims 40, 44, 45, or 50 which includes a quantity of void filling material located between each cable and the sleeve in the region at the end of each cable shield.

62. A joint between two shielded electric cables comprising:
  (a) two shielded electrical cables, each comprising a conductor, a dielectric layer which surrounds the conductor and which has been cut back to expose a length of the conductor, and an electrically conductive shield which surrounds the dielectric layer and which has been cut back to expose a length of the dielectric layer; and
  (b) an enclosure comprising a protective sleeve comprising an insulating inner layer and a conductive outer layer electrically connected to and overlapping each cable shield, the conductive outer layer being radially spaced from each cable shield by the insulating layer, wherein the insulating layer overlaps each cable shield by an amount at least equal to the thickness of the portion of the insulating layer overlying that cable shield end, and
  wherein electrical connection between the conductive outer layer and each cable shield is made at a point on that cable shield at a distance from the end of that cable shield at least equal to the thickness of the portion of the insulating layer overlying that cable shield end.

63. A joint as claimed in claims 40, 44, 45, 50, and 62 wherein the insulating inner layer has been formed by extrusion.

64. A joint as claimed in claim 62 wherein the insulating inner layer and the conductive outer layer have been formed by extrusion.

65. A joint as claimed in claim 62 including a stress grading layer between each cable and the insulating layer, the stress grading layer being electrically connected to each cable shield.

66. A joint between two shielded electrical cables, comprising
  (a) two cables, each comprising a conductor, a dielectric layer which surrounds the conductor and which has been cut back to expose a length of the conductor, and an electrically conductive shield which surrounds the dielectric layer and which has been cut back to expose a length of the dielectric layer, and
  (b) an enclosure comprising a tubular protective sleeve comprising an innermost stress grading layer having an at least partly resistive character and extending from the exposed conductor to overlap each cable shield, a conductive outer layer electrically contacting the stress grading layer at said overlap with each cable shield, and an insulating layer that separates the stress grading layer and the conductive layer in the region between said overlap and the exposed conductor.

67. A cable joint between two shielded electrical cables, comprising:
  (a) two cables, each comprising a conductor, a dielectric layer which surrounds the conductor and which has been cut back to expose a length of the conductor, and an electrically conductive shield which surrounds the dielectric layer and which has been cut back to expose a length of the dielectric layer, and
  (b) an enclosure comprising a tubular protective sleeve comprising an inner insulating layer having a first portion of substantially uniform minimum thickness overlapping each cable shield by an amount at least equal to said minimum thickness, a contiguous second portion of gradually increasing thickness to provide stress control, and a contiguous third portion of substantially uniform maximum thickness extending to the region of the exposed conductor, and an outer conductive layer overlapping each cable shield, radially spaced apart from each cable shield, and electrically connected to each cable shield at a distance from the end of that cable shield at least equal to said minimum thickness.

68. The joint as claimed in claim 67 which includes a stress grading layer located between each cable and each insulating layer at least in the region of the exposed conductors.

69. The joint as claimed in claim 67 which includes a stress grading layer located between each cable and the insulating layer at least in the region of the end of each cable shield.

70. The joint as claimed in claim 67 including a stress grading layer between each cable and the insulating layer, the stress grading layer being electrically connected to each cable shield.

71. A shielded joint between two shielded electrical cables comprising:
(a) two shielded electrical cables, each cable comprising a conductor, a dielectric layer which surrounds the conductor and which has been cut back to exposed a length of the conductor, and an electrically conductive shield which surrounds the dielectric layer and which has been cut back to expose a length of the dielectric layer; and
(b) an enclosure comprising a protective sleeve comprising an insulating inner layer overlapping each cable shield and a conductive outer layer electrically connected to each cable shield, said sleeve also being provided with an innermost stress grading layer having at least partly resistive character and electrically connected to each cable shield, and wherein electrical connection between the conductive outer layer and each cable shield is made at a point on that cable shield at a distance from the end of that cable shield at least equal to the thickness of the portion of the insulating layer overlying that cable shield end and beyond the end of the insulating layer overlying that cable shield end.

72. The joint of claim 71 wherein the insulating layer has a substantially uniform wall thickness along its entire length.

73. A shielded joint between two shielded electrical cables comprising:
(a) two shielded electrical cables, each cable comprising a conductor, a dielectric layer which surrounds the conductor and which has been cut back to expose a length of the conductor, and an electrically conductive shield which surrounds the dielectric layer and which has been cut back to expose a length of the dielectric layer; and
(b) an enclosure comprising a tubular protective sleeve comprising an insulating inner layer overlapping each cable shield and a conductive outer layer electrically connected to each cable shield, said sleeve also being provided with an innermost stress grading layer having at least partly resistive character and electrically connected to each cable shield, wherein the insulating layer has a substantially uniform wall thickness along its entire length and wherein electrical connection between the conductive outer layer and each cable shield is made at a point on the cable shield at a distance from the end of that cable shield at least equal to the thickness of the portion of the insulating layer overlying that cable shield end.

74. The joint of claim 71 or 73 wherein the stress grading layer overlaps each cable shield.

75. A shielded joint between two shielded electrical cables comprising:
(a) two shielded electrical cables, each cable comprising a conductor, a dielectric layer which surrounds the conductor and which has been cut back to expose a length of the conductor, and an electrically conductive shield which surrounds the dielectric layer and which has been cut back to expose a length of the dielectric layer; and
(b) an enclosure comprising a protective sleeve comprising an insulating inner layer and a conductive outer layer electrically connected to each cable shield, said sleeve also being provided with an innermost stress grading layer having at least partly resistive character and electrically connected to each cable shield, and wherein both the conductive outer layer and the stress grading layer overlie both cable shield ends.

76. The joint of claim 75 wherein the insulating layer has a substantially uniform wall thickness along its entire length.

77. A shielded joint as claimed in claim 76, wherein the insulating layer is formed by extrusion.

78. The joint of claim 75 wherein the conductive outer layer is in contact with the stress grading layer where the stress grading layer overlies the cable shields.

79. A cable joint between two shielded electrical cables, comprising:
(a) two cables, each comprising a conductor, a dielectric layer which surrounds the conductor and which has been cut back to expose a length of the conductor, and an electrically conductive shield which surrounds the dielectric layer and which has been cut back to expose a length of the dielectric layer, and
(b) an enclosure comprising a tubular protective sleeve comprising an insulating inner layer, a conductive outer layer electrically connected to each cable shield and an innermost stress grading layer having at least partly resistive character and extending from each exposed conductor to each cable shield; said insulating layer having a first portion of substantially uniform minimum thickness overlapping each cable shield by an amount at least equal to said minimum thickness, a contiguous second portion of gradually increasing thickness to provide stress control, and a contiguous third portion of substantially uniform maximum thickness extending to the region of the exposed conductors, and the outer conductive layer overlapping each cable shield radially spaced apart from each cable shield, and electrically connected to each cable shield at a distance from the end of each cable shield at least equal to said minimum thickness.

80. A protective sleeve for a cable termination or splice which comprises a dimensionally recoverable extruded tubular article having an innermost stress grading resistive layer, an insulating inner layer and a conductive outer layer, wherein the insulating layer has a substantially uniform wall thickness along its entire length.

81. A method of protecting a termination of a shielded electrical cable against electrical stress, the cable comprising a conductor, a dielectric layer which surrounds the conductor and which has been cut back to expose the conductor, and an electrically conductive shield which surrounds the dielectric layer and which has been cut back to expose the dielectric layer, the method comprising the steps of (a) placing on the termination in conforming engagement with the termination a conforming enclosure comprising a protective sleeve comprising an insulating inner layer and a conductive outer layer, said sleeve also being provided with an innermost stress grading layer having an at least partially resistive character extending from the exposed conductor to the cable shield, such that the insulating layer and the stress grading layer overlap the cable shield, the insulating layer overlapping the cable shield by an amount at least equal to the thickness of the portion of the insulating layer overlying the cable shield end and (b) electrically connecting the conductive outer layer and the cable shield at a point on the cable shield at a distance from the end of the cable shield at least equal to the thickness of the portion of the insulating layer overlying the cable shield end.

82. A method of protecting a termination of a shielded electrical cable against electrical stress, the cable comprising a conductor, a dielectric layer which surrounds the conductor and which has been cut back to expose the conductor, and an electrically conductive shield which surrounds the dielectric layer and which has been cut back to expose the dielectric layer, the method comprising the steps of (a) placing on the termination in conforming engagement with the termination a conforming enclosure comprising a protective sleeve comprising an insulating inner layer and a conductive outer layer, such that the insulating layer overlaps the cable shield by an amount at least equal to the thickness of the portion of the insulating layer overlying the cable shield end and (b) electrically connecting the conductive outer layer and the cable shield at a point on the cable shield at a distance from the end of the cable shield at least equal to the thickness of the portion of the insulating layer overlying the cable shield end.

83. A method as claimed in claim 81 or 82 wherein the enclosure is heat recoverable and is brought into conforming engagement with the cable termination by applying heat to the enclosure.

84. A method as claimed in claim 83 wherein the enclosure is formed in situ by bringing successive tubular layers of insulating and conductive material sequentially into conforming engagement with the termination.

85. A method of protecting a termination of a shielded electrical cable against electrical stress, the cable comprising a conductor, a dielectric layer which surrounds the conductor, and an electrically conductive shield which surrounds the dielectric layer, the method comprising the steps of selecting for the termination a conforming enclosure comprising a protective sleeve comprising an insulating inner layer and a conductive outer layer, and placing the enclosure on the termination so that the insulating layer overlaps the cable shield by an amount at least equal to the thickness of the portion of the insulating layer overlying the cable, so that the conductive outer layer overlaps and is radially spaced apart from the cable shield, and so that electrical connection between the conductive outer layer and the cable shield is made at a point on the cable shield at a distance from the end of the cable shield at least equal to the thickness of the portion of the insulating layer overlying the cable shield end.

86. The method of claim 85 wherein the insulating layer has a substantially uniform wall thickness along its entire length.

87. A method of protecting a termination of a shielded electrical cable against electrical stress, the cable comprising a conductor, a dielectric layer which surrounds the conductor, and an electrically conductive shield which surrounds the dielectric layer, the method comprising the steps of selecting for the termination a conforming enclosure comprising a protective sleeve comprising an innermost stress grading layer having at least partially resistive character, an insulating inner layer and a conductive outer layer, and placing the enclosure on the termination such that the insulating layer overlaps the cable shield end, the stress grading layer is electrically connected to the cable shield, and electrical connection between the conductive outer layer and the cable shield is made at a point on the cable shield at a distance from the end of the cable shield at least equal to the thickness of the portion of the insulating layer overlying the cable shield end and beyond the end of the insulating layer overlying the cable shield end.

88. A method of protecting a termination of a shielded electrical cable against electrical stress, the cable comprising a conductor, a dielectric layer which surrounds the conductor, and an electrically conductive shield which surrounds the dielectric layer, the method comprising the steps of
(1) selecting for the termination a conforming enclosure comprising a protective sleeve comprising:
    (a) an innermost stress grading layer having at least partially resistive character;
    (b) an insulating inner layer having a substantially uniform wall thickness; and
    (c) a conductive outer layer, and
(2) placing the enclosure on the termination such that the insulating layer overlaps the cable shield, such that the stress grading layer is electrically connected to the cable shield, and such that electrical connection between the conductive outer layer and the cable shield is made at a point on the cable shield at a distance from the end of the cable shield at least equal to the thickness of the portion of the insulating layer overlying the cable shield end.

89. A method of protecting a joint between two shielded electrical cables against electrical stress, each cable comprising a conductor, a dielectric layer which surrounds the conductor and which has been cut back to expose the conductor, and an electrically conductive shield which surrounds the dielectric layer and which has been cut back to expose the dielectric layer, the method comprising the steps of (a) placing on the joint in conforming engagement with the joint a conforming enclosure comprising a protective sleeve comprising an insulating inner layer and a conductive outer layer, said sleeve also being provided with an innermost stress grading layer having an at least partially resistive character extending from the exposed conductor to each cable shield, such that the insulating layer and the stress grading layer overlap each cable shield, the insulating layer overlapping the cable shield by an amount at least equal to the thickness of the portion of the insulating layer overlying that cable shield end and (b) electrically connecting the conductive outer layer and each cable shield at a point on that cable shield at a distance from the end of that cable shield at least equal to the thickness of the portion of the insulating layer overlying that cable shield end.

90. A method of protecting a joint between two shielded electrical cables against electrical stress, each cable comprising a conductor, a dielectric layer which surrounds the conductor and which has been cut back to expose the conductor, and an electrically conductive shield which surrounds the dielectric layer and which has been cut back to expose the dielectric layer, the method comprising the steps of (a) placing on the joint in conforming engagement with the joint a conforming enclosure comprising a protective sleeve comprising an insulating inner layer and a conductive outer layer such that the insulating layer overlaps each cable shield by an amount at least equal to the thickness of the portion of the insulating layer overlying that cable shield end and (b) electrically connecting the conductive outer layer and each cable shield at a point on that cable shield at a distance from the end of that cable shield at least equal to the thickness of the portion of the insulating layer overlying that cable shield end.

91. A method as claimed in claims 89 or 90 wherein the enclosure is heat recoverable and is brought into conforming engagement with the cable joint by applying heat to the enclosure.

92. A method as claimed in claim 91 wherein the enclosure is formed in situ by bringing successive tubular layers of insulating and conductive material sequentially into conforming engagement with the joint.

93. A method of protecting a joint between two shielded electrical cables against electrical stress, each cable comprising a conductor, a dielectric layer which surrounds the conductor, and an electrically conductive shield which surrounds the dielectric layer, the method comprising the steps of selecting for the joint a conforming enclosure comprising a protective sleeve comprising an insulating inner layer and a conductive outer layer, and placing the enclosure on the joint so that the insulating layer overlaps each cable shield by an amount at least equal to the thickness of the portion of the insulating layer overlying that cable, so that the conductive outer layer overlaps and is radially spaced apart from each cable shield, and so that electrical connection between the conductive outer layer and each cable shield is made at a point on that cable shield at a distance from the end of that cable shield at least equal to the thickness of the portion of the insulating layer overlying that cable shield end.

94. The method of claim 93 wherein the insulating layer has a substantially uniform wall thickness along its entire length.

95. A method of protecting a joint between two shielded electrical cables against electrical stress, each cable comprising a conductor, a dielectric layer which surrounds the conductor, and an electrically conductive shield which surrounds the dielectric layer, the method comprising the steps of selecting for the joint a conforming enclosure comprising a protective sleeve comprising an innermost stress grading layer having at least partially resistive character, an insulating inner layer and a conductive outer layer, and placing the enclosure on the joint such that the insulating layer overlaps each cable shield end, the stress grading layer is electrically connected to each cable shield, and electrical connection between the conductive outer layer and each cable shield is made at a point on that cable shield at a distance from the end of that cable shield at least equal to the thickness of the portion of the insulating layer overlying that cable shield end and beyond the end of the insulating layer overlying that cable shield end.

96. A method of protecting a joint between two shielded electrical cables against electrical stress, each cable comprising a conductor, a dielectric layer which surrounds the conductor, and an electrically conductive shield which surrounds the dielectric layer, the method comprising the steps of
  (1) selecting for the joint a conforming enclosure comprising a protective sleeve comprising:
    (a) an innermost stress grading layer having at least partially resistive character;
    (b) an insulating inner layer having a substantially uniform wall thickness; and
    (c) a conductive outer layer, and
  (2) placing the enclosure on the joint such that the insulating layer overlaps each cable shield, such that the stress grading layer is electrically connected to each cable shield, and such that electrical connection between the conductive outer layer and each cable shield is made at a point on that cable shield at a distance from the end of that cable shield at least equal to the thickness of the portion of the insulating layer overlying that cable shield end.

* * * * *